(12) United States Patent
Baker et al.

(10) Patent No.: US 6,761,325 B2
(45) Date of Patent: Jul. 13, 2004

(54) DUAL FUEL INJECTION VALVE AND METHOD OF OPERATING A DUAL FUEL INJECTION VALVE

(75) Inventors: S. Michael Baker, Delta (CA); David Mumford, Richmond (CA); Adrian Post, Surrey (CA); Tim Lennox, Vancouver (CA); Alain M. J. Touchette, Surrey (CA); Bradley D. Douville, West Vancouver (CA)

(73) Assignee: Westport Research Inc., Vancouver (CA)

( * ) Notice: Subject to any disclaimer, the term of this patent is extended or adjusted under 35 U.S.C. 154(b) by 121 days.

(21) Appl. No.: 09/989,623

(22) Filed: Nov. 20, 2001

(65) Prior Publication Data

US 2002/0070295 A1 Jun. 13, 2002

Related U.S. Application Data

(63) Continuation-in-part of application No. 09/552,480, filed on Apr. 18, 2000, now Pat. No. 6,336,598, which is a continuation-in-part of application No. 09/154,103, filed on Sep. 16, 1998, now Pat. No. 6,073,862.

(51) Int. Cl.[7] .................. F02M 59/00; F02M 39/00; B05B 1/30
(52) U.S. Cl. .................. 239/533.3; 239/533.2; 239/585.1; 239/585.4; 239/585.5; 239/88
(58) Field of Search .................. 239/533.3, 533.2, 239/533.4, 585.5, 585.4, 585.1, 585.2, 533.9, 533.12, 533.11, 408, 409, 96, 410, 88, 89, 91; 251/129.15, 129.21, 127

(56) References Cited

U.S. PATENT DOCUMENTS 3,977,367 A    8/1976   Roberts ............... 123/8.09
4,022,165 A    5/1977   Eckert et al. ............ 123/32
4,187,825 A    2/1980   Loyd, Jr. et al. ......... 123/205
4,693,227 A    9/1987   Satou ..................... 123/575
6,073,862 A  * 6/2000   Touchette et al. ......... 239/408
6,189,817 B1   2/2001   Lambert ................. 239/533.2
6,260,775 B1 * 7/2001   Lambert et al. ......... 239/533.3
6,336,598 B1 * 1/2002   Touchette et al. ......... 239/408

FOREIGN PATENT DOCUMENTS

| EP | 0 546 985 | 6/1993 |
| EP | 0 878 623 | 11/1998 |
| EP | 1 063 417 | 12/2000 |
| EP | 1 111 229 | 6/2001 |
| JP | 60-228766 | 11/1985 |

* cited by examiner

*Primary Examiner*—Davis Hwu
(74) *Attorney, Agent, or Firm*—McAndrews, Held & Malloy, Ltd.

(57) ABSTRACT

A dual fuel injection valve separately and independently injects two different fuels into a combustion chamber of an internal combustion engine. A first fuel is delivered to the injection valve at injection pressure and a second fuel is either raised to injection pressure by an intensifier provided within the injection valve, or delivered to the injection valve at injection pressure. Electronically controlled valves control hydraulic pressure in control chambers disposed within the injection valve. The pressure of the hydraulic fluid in these control chambers is employed to independently actuate a hollow outer needle that controls the injection of the first fuel. Disposed within the outer needle is an inner needle that controls the injection of the second fuel. The outer needle closes against a seat associated with the injection valve body and the inner needle closes against a seat associated with the outer needle.

36 Claims, 9 Drawing Sheets

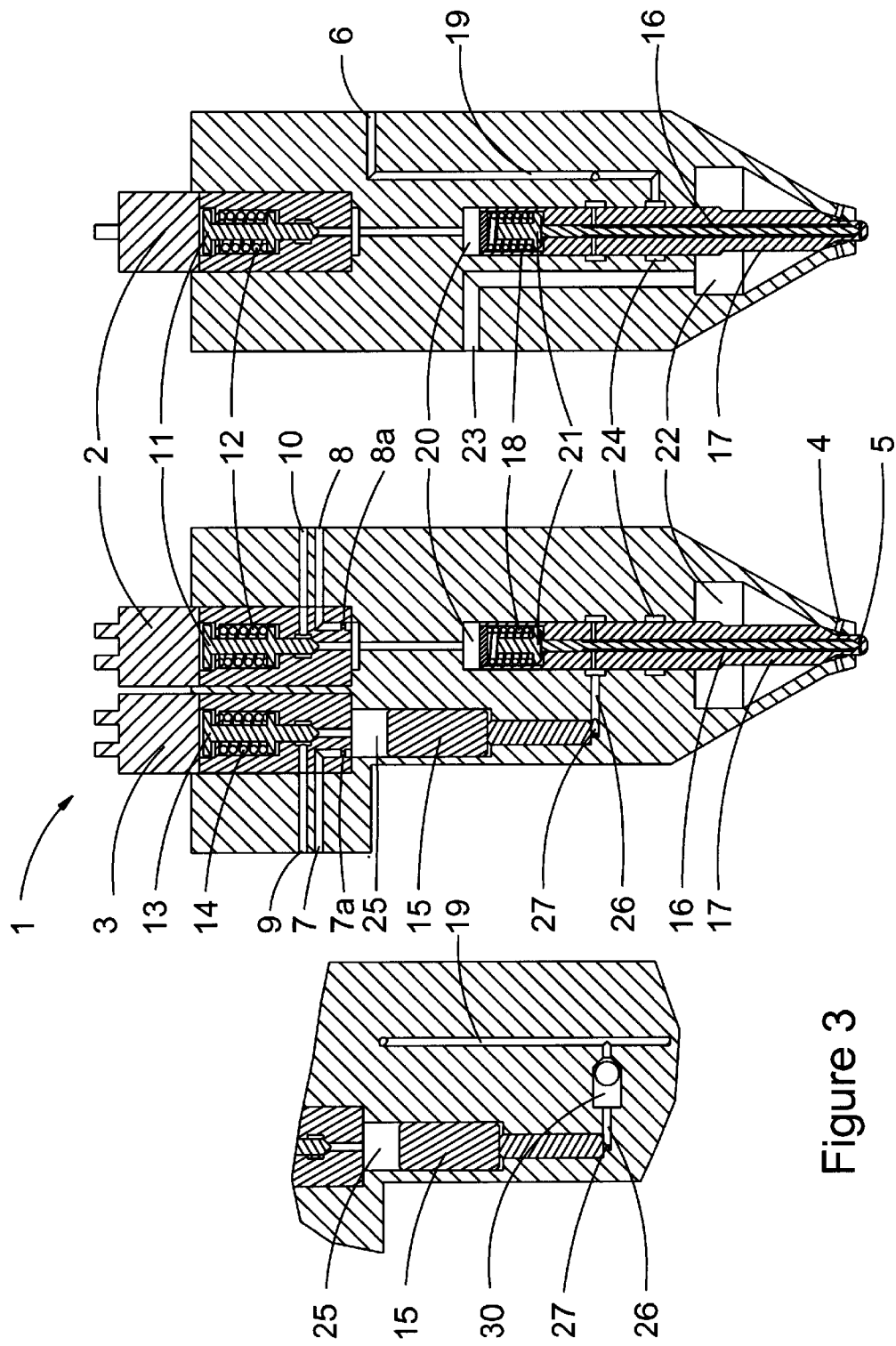

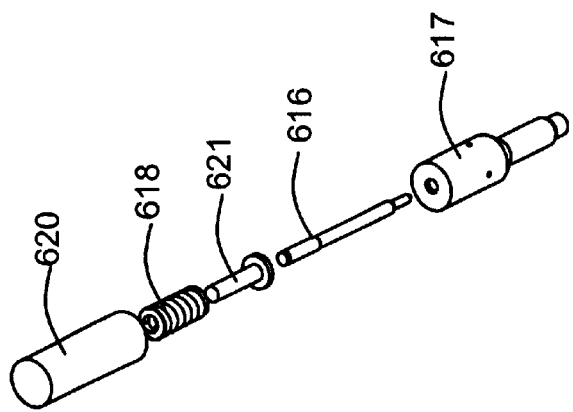
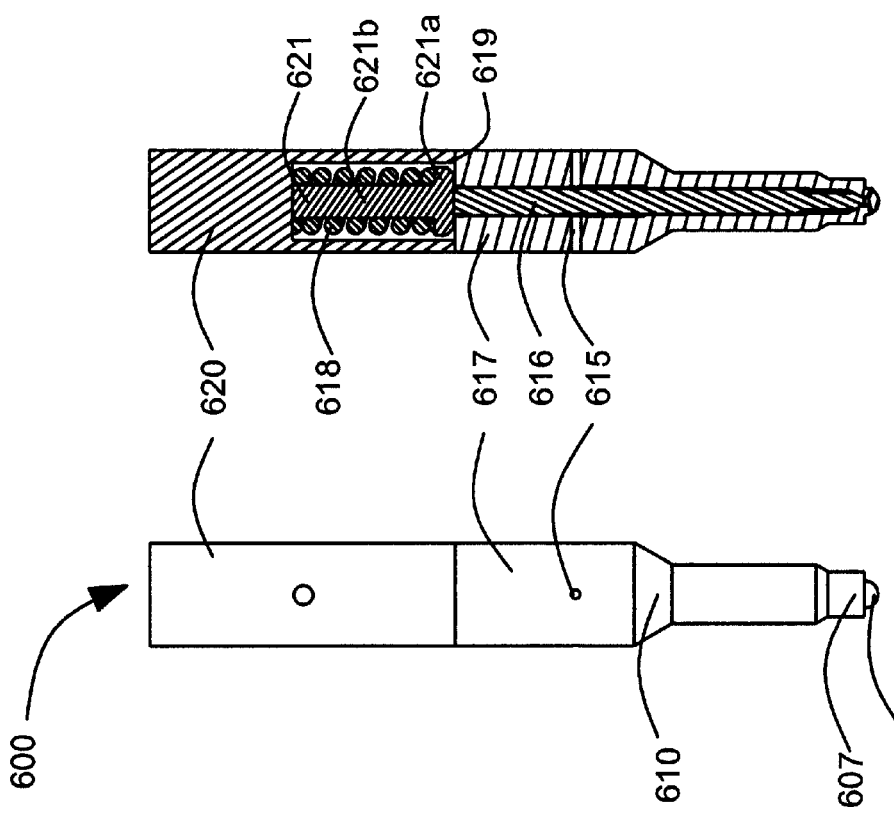
Fig. 15
Fig. 14
Fig. 13

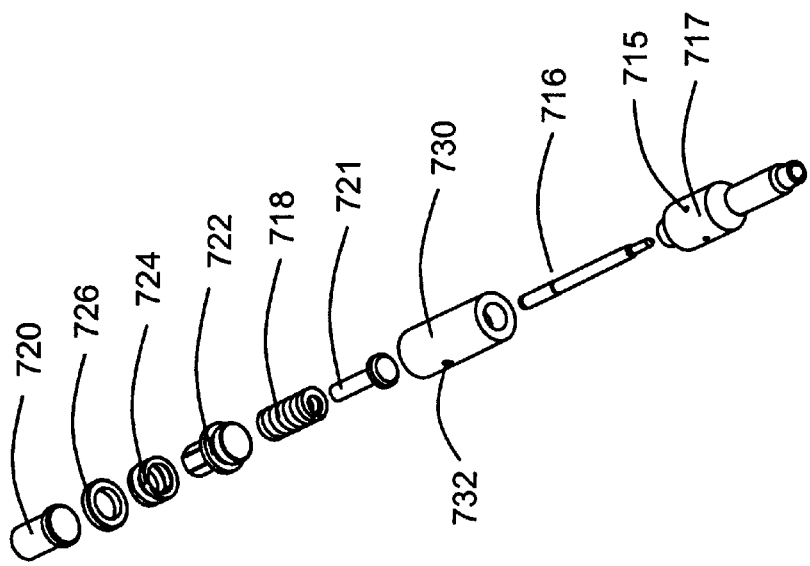
Fig. 18
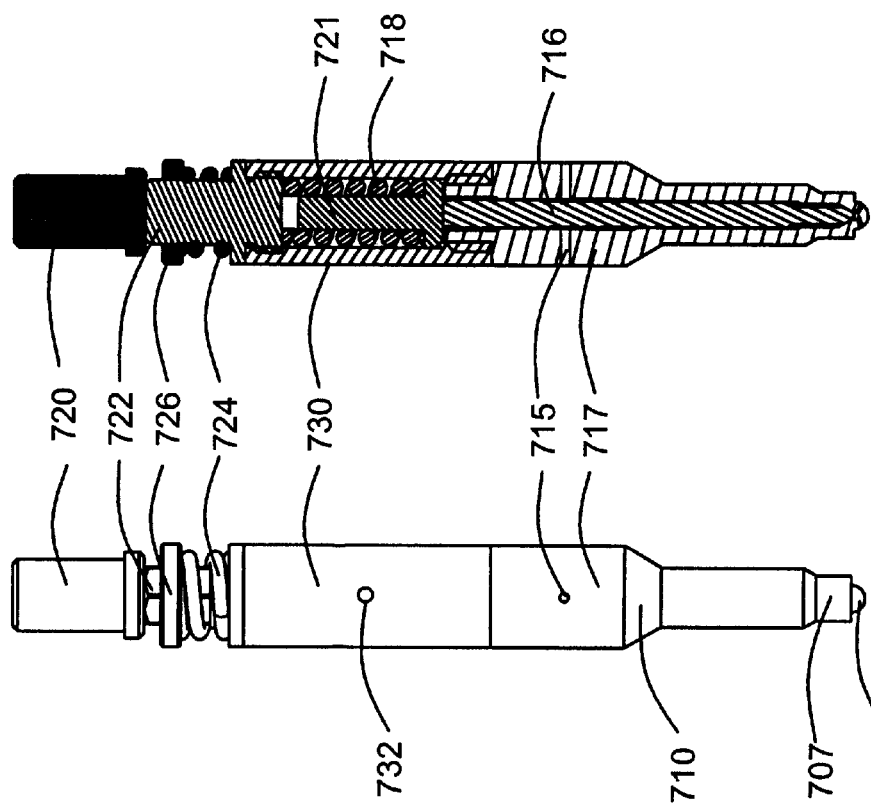
Fig. 17
Fig. 16

US 6,761,325 B2

DUAL FUEL INJECTION VALVE AND METHOD OF OPERATING A DUAL FUEL INJECTION VALVE

CROSS-REFERENCE TO RELATED APPLICATION(S)

This application is a continuation-in-part of U.S. patent application Ser. No. 09/552,480 filed Apr. 18, 2000 now U.S. Pat. No. 6,336,598, entitled "Gaseous and Liquid Fuel Injection Valve with a Two-Way Hydraulic Fluid Control Valve", which is a continuation-in-part of U.S. patent application Ser. No. 09/154,103 filed Sep. 16, 1998, entitled "Gaseous and Liquid Fuel Injection Valve", now U.S. Pat. No. 6,073,862 issued Jun. 13, 2000. The '103 and the '480 applications are incorporated herein by reference in their entirety.

FIELD OF THE INVENTION

The present invention relates to a hydraulically actuable dual fuel injection valve and a dual needle assembly, for injecting two different fuels into the combustion chamber of an internal combustion engine.

BACKGROUND OF THE INVENTION

Because of its ready availability, low cost and potential for reducing particulate emissions, natural gas is a promising substitute for diesel fuel for fuelling compression ignition engines, commonly known as "diesel-cycle" engines. Persons skilled in the technology involved here will understand that natural gas is just one example of a preferred fuel, and that other fuels are also suitable, such as hydrogen, propane and other fuels that are cleaner burning substitutes for diesel fuel. A cleaner burning substitute fuel for diesel is defined as a fuel that can be used in an engine to substantially match the performance of a diesel-fuelled engine with lower particulate matter and/or nitrogen oxide (NOx) emissions.

Conventional methods of introducing a gaseous fuel into an engine premix all of the gaseous fuel with the intake air, which is a method known as "fumigation". Engines using such an approach have been unable to match the power, performance, and efficiency of diesel-fuelled engines. The applicant has found that the inherent favorable operating characteristics and high efficiency of conventional diesel-fuelled engines can be preserved when at least some of the gaseous fuel is introduced directly into the engine's combustion chamber, late in the compression stroke.

A problem with gaseous fuels such as natural gas is that, compared to diesel fuel, much higher temperatures and pressures are typically needed to auto-ignite the fuel. A solution to this problem, which allows the preservation of the major components of diesel-cycle engines is to inject a small amount of more auto-ignitable fuel such as diesel fuel, to initiate the ignition and combustion of the cleaner burning gaseous fuel.

Using a pilot fuel in addition to a main charge of gaseous fuel requires the installation of at least two independently operable injection valves, one for the pilot fuel and one for the gaseous main fuel. To avoid having to redesign and replace the cylinder head, it is preferable to employ a gaseous and liquid fuel injection valve that fits into the same opening as a conventional diesel fuel injection valve. Accordingly, there is a need for a gaseous and liquid fuel injection valve arrangement that allows independent introduction of liquid pilot fuel and gaseous main fuel directly into the combustion chamber, and that has the same exterior dimensions as a conventional diesel injection valve.

SUMMARY OF THE INVENTION

A dual fuel injection valve separately injects a main fuel and a pilot fuel into a combustion chamber of an internal combustion engine. The injection valve comprises:

(a) a hollow injection valve body comprising:
  a hydraulic fluid inlet port through which pressurized hydraulic fluid can be introduced into fluid passages and a control chamber disposed within the interior of the valve body;
  a hydraulic fluid drain port through which hydraulic fluid can be drained from the control chamber;
  at least one control valve that is operable to selectively direct the flow of the hydraulic fluid and control hydraulic fluid pressure within the control chamber to influence movement of at least one of an outer needle and an inner needle between respective open and closed positions;
  a first-fuel inlet port through which a first fuel can be introduced at injection pressure into the valve body;
  a first-fuel passage provided within the valve body and extending between the first-fuel inlet port and a first-fuel cavity associated with the outer needle;
  a second-fuel inlet port through which a second fuel can be introduced into the valve body;
  a second-fuel passage connecting the second-fuel inlet port to a second-fuel cavity associated with the inner needle; and (b) a dual needle assembly comprising:
  the outer needle, which is hollow and disposed within the injection valve body, wherein the outer needle is movable between a closed position in which a first sealing surface associated with the outer needle contacts a first seat associated with the body and an open position in which the first sealing surface is spaced apart from the first seat, allowing the first fuel to flow from within the first-fuel cavity into the combustion chamber through at least one first-fuel ejection port; and
  the inner needle, which is disposed within the hollow outer needle, wherein the inner needle is movable between a closed position in which a second sealing surface associated with the inner needle contacts a second seat associated with the outer needle and an open position in which the second sealing surface is spaced apart from the second seat, allowing the second fuel to flow from within the second-fuel cavity into the combustion chamber through at least one second-fuel ejection port.

In one embodiment, the first fuel is a main fuel and the second fuel is a pilot fuel that is more auto-ignitable than the main fuel. The hollow outer needle preferably serves as an inner valve body and the second-fuel cavity is preferably an annular cavity disposed between the inner needle and the outer needle.

The control chamber is preferably employed to influence the position of the outer needle and an inlet fluid passage connects the control chamber to the hydraulic fluid inlet port, a drain fluid passage connects the control chamber to the drain port, and the control valve is operable to selectively control the flow of hydraulic fluid between the control chamber and the drain port or the hydraulic fluid inlet port to modulate pressure within the control chamber between drain pressure, when pressure within the control chamber is associated with pressure at the drain port, and rail pressure, when pressure within the control chamber is associated with pressure at the hydraulic fluid inlet port.

The dual needle assembly is preferably dynamically disposed within the control chamber and the volume of the control chamber is preferably variable in response to movement of the dual needle assembly. Pressure within the control chamber is preferably held at rail pressure to generate a hydraulic force that contributes to maintaining the outer needle in the closed position. A spring preferably provides an additional closing force that cooperates with the hydraulic force to maintain the outer needle in the closed position. Fuel pressure within the first-fuel cavity preferably generates an opening force acting on the outer needle whereby the outer needle is movable to the open position under the influence of the opening force when pressure within the control chamber is reduced to close to drain pressure.

The outer needle is preferably biased in the closed position when pressure within the control chamber is at drain pressure or close to drain pressure (that is, the control chamber pressure has a value sufficiently near drain pressure such that the outer needle is nevertheless biased in the closed position) and the outer needle is movable to the open position when hydraulic fluid pressure within the control chamber is at rail pressure. Preferably, a spring biases the outer needle in the closed position. The outer needle preferably comprises a shoulder disposed within the first control chamber and when pressure within the first control chamber is raised to rail pressure the hydraulic force is applied to the shoulder.

In another embodiment of the present injection valve, the body preferably further comprises a second control chamber employed to influence the position of the inner needle and a second control valve is preferably operable to selectively control pressure of hydraulic fluid within the second control chamber to generate a hydraulic force that contributes to positioning the inner needle in one of the closed or open positions. The inner needle preferably comprises a shoulder that is dynamically disposed within the second-fuel cavity and the shoulder provides an area for receiving an opening force generated by fuel pressure within the second-fuel cavity. The injection valve preferably further comprises an inner spring disposed within the dual needle assembly that biases the inner needle in the closed position. The hydraulic force generated within the second control chamber preferably provides a force that acts on a movable intensifier piston that is operable to pressurize the second fuel. The second fuel can thereby be pressurized to an intensified pressure to generate an opening force acting on the inner needle that compresses the inner spring to move the inner needle to the open position.

The hydraulic fluid pressure within the second control chamber preferably generates a hydraulic force that acts directly upon the dual needle assembly to influence positioning of the inner needle in one of the closed or open positions. The rail pressure within the second control chamber is preferably employed to generate a hydraulic force that contributes to maintaining the inner needle in the closed position.

The second control chamber is preferably disposed within the dual needle assembly and a member associated with the inner needle is preferably dynamically disposed within the second control chamber such that the volume of the second control chamber is variable in response to movement of the member which causes a corresponding movement of the inner needle.

An inner spring preferably provides an additional closing force that cooperates with the hydraulic force to maintain the inner needle in the closed position.

The inner needle is preferably movable to the open position under the influence of an opening force generated by hydraulic fluid at rail pressure within the second control chamber. The inner needle is preferably biased in the closed position by an inner spring and the second control chamber is the second-fuel cavity. The inner needle is thereby movable to the open position when pressure within the second-fuel cavity is at rail pressure.

In another embodiment of the present injection valve, the dual needle assembly preferably further comprises a cap dynamically disposed within the control chamber between the outer needle and the valve body such that, when the control chamber associated with the outer needle is filled with hydraulic fluid at rail pressure, the hydraulic force urges the cap towards the outer needle and a closing force is transmitted through the cap to the outer needle. The outer needle is preferably movable to the open position under the influence of fuel pressure within the first-fuel cavity acting on the outer needle when pressure within the control chamber is reduced to drain pressure. The injection valve preferably further comprises an inner spring disposed within the hollow outer needle between the cap and the inner needle for biasing the inner needle in the closed position. The cap preferably comprises an open-ended bore facing the inner needle and the assembly preferably further comprises an inner spring disposed within the bore between the cap and the inner needle. The inner spring preferably biases the inner needle in the closed position. The cap is preferably detached from the outer needle such that the inner spring can expand to contribute to holding the outer needle in the closed position by spacing the cap from the outer needle. The cap is preferably joinable in fixed relationship to the outer needle. The cap is preferably releasably joined to the outer needle by a threaded connection or by interlocking features.

In another embodiment of the present injection valve, the dual needle assembly preferably further comprises an inner valve body comprising:

the outer needle;

a hollow inner valve housing joined to the outer needle; and a cap joined to the hollow inner valve housing.

The inner needle is preferably disposed within the outer needle and the second-fuel cavity is an annular space between the inner needle and the outer needle. At least one of an inner spring and the second control chamber is preferably disposed within the hollow inner valve housing for biasing the inner needle in the closed position. The cap is preferably dynamically disposed within the control chamber associated with the outer needle. The present injection valve preferably further comprises an outer spring disposed between the cap and the valve body. The outer spring thereby contributes to biasing the outer needle in the closed position.

In another embodiment of the present injection valve, the dual needle assembly further comprises:

a cap dynamically disposed within the control chamber associated with the outer needle whereby a closing force can be transmitted through the cap to the outer needle; and an inner spring disposed between the cap and a member associated with the inner needle.

The inner spring contributes to biasing the inner needle in the closed position by imparting a closing force through the member to the inner needle. The inner spring can also contribute to biasing the outer needle in the closed position by expanding to space the cap from the outer needle.

In another embodiment of the present injection valve, the outer needle preferably further comprises a shoulder disposed within the control chamber associated with the outer needle. The outer needle is thereby movable to the open position when the control chamber is filled with hydraulic fluid at rail pressure. The present injection valve preferably further comprises a spring disposed between the dual needle assembly and the injection valve body for biasing the outer needle in the closed position.

A dual needle assembly for a dual fuel injection valve independently and separately injects two different fuels into a combustion chamber. The dual needle assembly comprises:

- a hollow outer needle that can be dynamically disposed within a hollow injection valve body, wherein the outer needle is movable within the injection valve body between a closed position when a first sealing surface associated with the outer needle is urged against a first seat associated with the injection valve body, and an open position when the first sealing surface is spaced apart from the first seat;
- an inner valve body comprising:
  the outer needle; and
  a cap joined to the outer needle;
- an inner needle dynamically disposed within the outer needle, wherein the inner needle is movable within the outer needle between a closed position when a second sealing surface associated with the inner needle is urged against a second seat associated with the outer needle, and an open position when the second sealing surface is spaced apart from the second seat;
- an inner spring disposed within the inner valve body between the cap and the inner needle which contributes to biasing the inner needle in the closed position; and
- at least one fuel ejection port provided in the outer needle that allows fuel to be ejected from an inner fuel cavity within the inner valve body when the inner needle is in the open position.

In one embodiment of the present dual needle assembly, the inner fuel cavity is preferably an annular volume disposed between the inner needle and the outer needle. The inner needle preferably has an outer diameter less than the inside diameter of the hollow outer needle. The inner valve body preferably further comprises a hollow inner valve housing disposed between and joined to the outer needle and the cap. The inner valve housing preferably comprises a bore for housing the inner spring and the space defined by the bore is sealed from the inner fuel cavity by a match fit between the inner needle and the outer needle. The space defined by the bore of the inner valve housing is preferably pressurizable with hydraulic fluid supplied from fluid passages within the injection valve body. Pieces of the inner valve body are preferably releasably joined together by interlocking features. The dual needle assembly interlocking features are preferably threaded joints. Pieces of the inner valve body are permanently joined together. The permanently joined pieces are preferably welded together. Other pieces of the inner valve body are preferably releasably joined together.

Another dual needle assembly for a dual fuel injection valve independently and separately injects two different fuels into a combustion chamber. The dual needle assembly comprises:

- a hollow outer needle comprising an open end and an opposite sealing end, which comprises a first sealing surface, and the outer needle can be dynamically disposed within a hollow injection valve body, wherein the outer needle is movable within the injection valve body between a closed position when the first sealing surface is urged against a first seat associated with the injection valve body, and an open position when the first sealing surface is spaced apart from the first seat;
- a cap associated with and detached from the open end of the outer needle, wherein the cap can be dynamically disposed within a control chamber of the injection valve body such that hydraulic fluid pressure within the control chamber can apply a force that is transmitted through the cap to the outer needle to influence the position of the cap and outer needle;
- an inner needle dynamically disposed within the outer needle, the inner needle comprising a supported end opposite to a sealing end, which comprises a second sealing surface, wherein the inner needle is movable within the outer needle between a closed position when the second sealing surface is urged against a second seat associated with the outer needle, and an open position when the second sealing surface is spaced apart from the second seat;
- an inner spring disposed within the inner valve body between the cap and the inner needle, whereby the inner spring contributes to biasing the inner needle in the closed position, and the inner spring can also contribute to biasing the outer needle in the closed position by expanding to space the cap away from the outer needle; and
- at least one fuel ejection port that allows fuel to be ejected from an inner fuel cavity within the hollow outer needle when the inner needle is in the open position.

In one embodiment of the present dual needle assembly, the supported end of the inner needle preferably has an outside diameter that is match fit with an inside diameter of a bore provided in the outer needle. The present dual needle assembly preferably further comprises a member that supports one end of the inner spring and that transmits closing forces from the inner spring to the inner needle and to the outer needle. The spring is preferably a coil spring and the member preferably comprises a flange for receiving one end of the coil spring and a stem that extends through the coil spring. The stem thereby cooperates with the cap to limit travel of the inner needle.

A method of operating a dual fuel injection valve independently and separately injects two different fuels into a combustion chamber of an internal combustion engine. The method comprises:

(a) supplying a first fuel at injection pressure to a first-fuel cavity within the injection valve;

(b) selectively applying a first closing force to a first needle to prevent the first fuel from being injected into the combustion chamber by holding the first needle in a closed position against a first seat;

(c) selectively injecting the first fuel into the combustion chamber from the first-fuel cavity by at least one of applying to the first needle a first opening force greater than the first closing force and reducing the first closing force such that the first needle is spaced apart from the first seat;

(d) supplying a second fuel at less than injection pressure to a second-fuel cavity within the injection valve;

(e) selectively applying a second closing force to a second needle to prevent the second fuel from being injected into the combustion chamber by holding the second needle in a closed position against a second seat;

(f) selectively operating an intensifier located within the injection valve to intensify the pressure of the second fuel within the second-fuel cavity to generate a second opening force acting on the second needle that is greater than the second closing force, such that the second needle is spaced apart from the second seat and the second fuel is injected into the combustion chamber from the second-fuel cavity.

The present method preferably further comprises metering the second fuel by controlling the stroke of the intensifier. The pressure of the first fuel within the first-fuel cavity preferably contributes to the first opening force by applying an opening force to a shoulder of the first needle. The first closing force is preferably generated by directing a pressurized hydraulic fluid to a control chamber within the injection valve and the first fuel is preferably injected when pressure within the control chamber is reduced by draining hydraulic fluid from the control chamber. The present method preferably further comprises selectively operating an electronically controlled valve to control the flow of the hydraulic fluid to and from the control chamber.

In another embodiment of the present method the first closing force is preferably generated by a compressed spring and the first fuel is preferably injected into the combustion chamber by directing a pressurized hydraulic fluid to a control chamber within which a shoulder of the first needle is dynamically disposed. The hydraulic fluid pressure acting on the shoulder preferably contributes to the first opening force such that the first opening force is greater than the first closing force. The present method preferably further comprises selectively operating an electronically controlled valve to control the flow of the hydraulic fluid to and from the control chamber.

In another embodiment of the present method, the intensifier is preferably hydraulically actuated by selectively supplying or draining a pressurized hydraulic fluid from a piston chamber within which an intensifier piston is dynamically disposed. The present method preferably further comprises selectively operating an electronically controlled valve to control the flow of the hydraulic fluid to and from the piston chamber.

In another embodiment of the present method, a compressed spring preferably contributes to the second closing force. The present method preferably further comprises utilizing hydraulic fluid pressure in a second control chamber to contribute to the second closing force applied to the second needle.

Another method of operating a dual fuel injection valve independently and separately injects two different fuels into a combustion chamber of an internal combustion engine. The method comprises:

(a) supplying a first fuel at injection pressure to a first-fuel cavity within the injection valve;

(b) selectively applying a first closing force to a first needle to prevent the first fuel from being injected into the combustion chamber by holding the first needle in a closed position against a first seat;

(c) selectively injecting the first fuel into the combustion chamber from the first-fuel cavity by at least one of applying a first opening force to the first needle that is greater than the first closing force and reducing the first closing force such that the first needle is spaced apart from the first seat;

(d) supplying a second fuel at injection pressure to a second-fuel cavity within the injection valve;

(e) selectively applying a second closing force to a second needle to prevent the second fuel from being injected into the combustion chamber by holding the second needle in a closed position against a second seat;

(f) selectively injecting the second fuel into the combustion chamber from the second-fuel cavity by at least one of applying a second opening force to the second needle that is greater than the second closing force and reducing the second closing force such that the second needle is spaced apart from the second seat.

BRIEF DESCRIPTION OF THE DRAWINGS

The drawings illustrate specific embodiments of the invention, but should not be considered as restricting the spirit or scope of the invention in any way:

FIGS. 3, 4 and 5 show respective detail, side and front section views of a first embodiment of a dual fuel injection valve taken along section lines C–C, A—A, and B–B shown externally in FIGS. 1 and 2. This embodiment of the injection valve uses high-pressure hydraulic fluid to maintain the first valve needle in the closed position.

FIGS. 13 through 15 depict a preferred arrangement for a dual needle assembly for an injection valve. This embodiment of a dual needle assembly can be employed, for example, in an injection valve of the type depicted in FIGS. 3 through 5. FIG. 13 is a side elevation view, FIG. 14 is a section view, and FIG. 15 is an exploded view.

FIGS. 16 through 18 depict another preferred arrangement for a dual needle assembly for an injection valve. This embodiment of a dual needle assembly can also be employed, for example, in an injection valve of the type depicted in FIGS. 3 through 5. FIG. 16 is a side elevation view, FIG. 17 is a section view, and FIG. 18 is an exploded view.

DETAILED DESCRIPTION OF PREFERRED EMBODIMENT(S)

A dual fuel injection valve is capable of independently and separately injecting a pilot fuel and a main fuel into a combustion chamber of an internal combustion engine. That is, the injection valve provides independent control of the injection timing and the fuel quantity for the pilot fuel and main fuel. In addition, the pilot fuel and main fuel are injected into the combustion chamber separately, through different ejection ports.

The main fuel is a fuel that is cleaner burning than conventional diesel fuel such that substitution of the main fuel for diesel fuel results in lower emissions of particulate matter and/or nitrogen oxides (NOx) compared to an equivalent conventional engine that burns only diesel fuel. Preferably, on average, the main fuel comprises more than 90% of the fuel consumed by the engine measured on an energy basis.

In preferred embodiments, the main fuel is a gaseous fuel such as natural gas, propane or hydrogen, and the pilot fuel is a liquid fuel such as diesel or dimethylether. The injection of the main fuel is independent from the injection of the pilot fuel so that, for example, at least some of the gaseous fuel is injectable sequentially after the liquid fuel. The selected liquid fuel auto-ignites to promote combustion of the main fuel.

In the illustrated embodiments, the dual fuel injection valve is operated using a constant high-pressure source of hydraulic fluid and at least one electrically-operated electronically-controlled hydraulic fluid control valves. The control valve(s) control the flow of hydraulic fluid to manipulate at least one of two valve needles. A first valve needle moves between an open and closed position for controlling the injection of the main fuel into the combustion chamber. A second valve needle moves between an open and closed position for controlling the injection of the pilot fuel into the combustion chamber.

Figure 1:
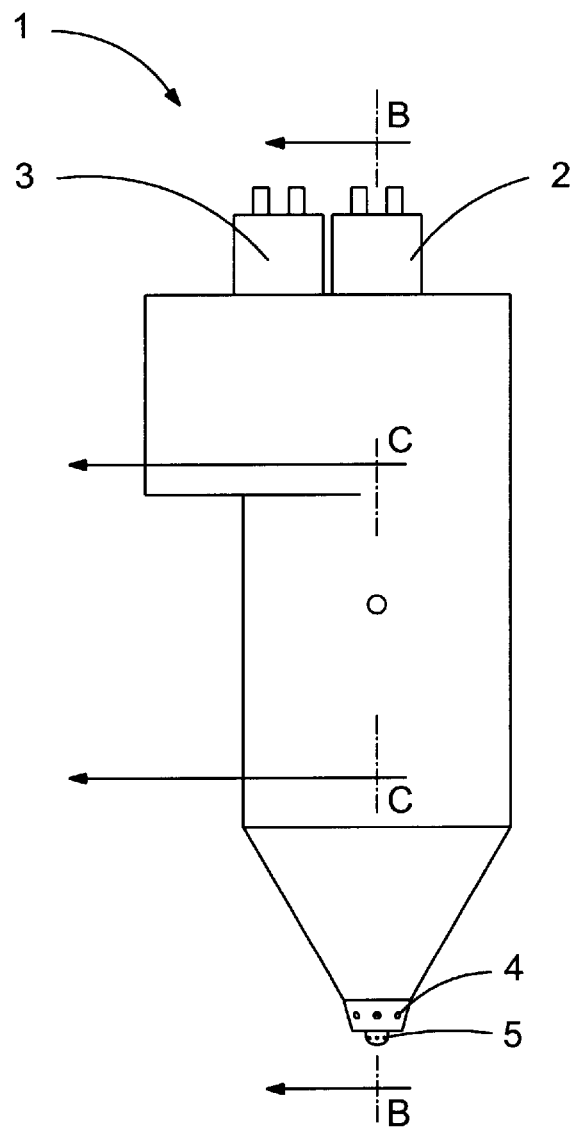
FIGS. 1 and 2 illustrate front and side elevation views of a dual fuel injection valve.
Figure 2:
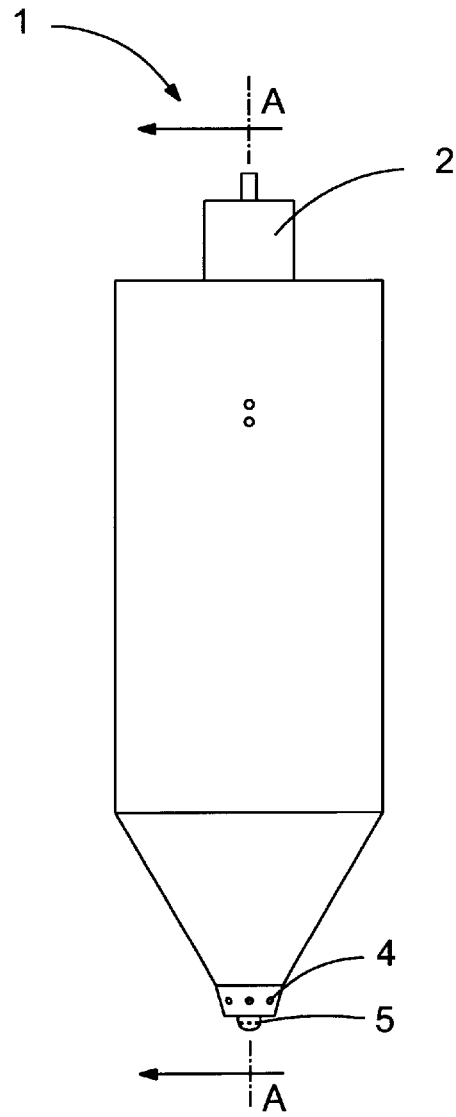

Referring to the drawings, FIGS. 1 and 2 show front and side elevation views of an embodiment of a dual fuel injection valve. The exterior of the valve body can be shaped to fit the opening in the cylinder head in which it is to be installed. In this embodiment, two electrically-operated electronically-controlled hydraulic fluid control valves are used, one to control the injection of the main fuel and one to control the injection of the pilot fuel. Specifically, FIG. 1 shows a front view of the exterior of dual fuel injection valve 1, with dual solenoids 2 and 3 at one end and main fuel ejection ports 4 and pilot fuel ejection ports 5 at the opposite end. Solenoids 2 and 3 electrically operate the hydraulic fluid control valves. Conventional electronic controls can be used to control the activation of solenoids 2 and 3 to thereby control the timing and quantity of the injection events whereby the two different fuels are separately introduced into the combustion chamber.

FIG. 2 illustrates a side view of dual fuel injection valve 1. In FIG. 2, solenoid 3 is hidden behind solenoid 2.

Since the exterior of injection valve 1 as illustrated in FIGS. 1 and 2 remains generally the same for the different internal embodiments, for purposes of brevity, and to eliminate redundancy, FIGS. 1 and 2 are not repeated.

With reference now to FIGS. 3 through 5, these Figures show respective detail, side, and front section views of a first embodiment of dual fuel injection valve 1 taken along respective sections lines C–C, A—A, and B–B shown externally in FIGS. 1 and 2. This embodiment uses high-pressure hydraulic fluid to bias main fuel valve needle 17 in the closed position.

Injection valve 1 can comprise the following features for controlling the flow of hydraulic fluid:

(a) three fluid inlets 6, 7, and 8;
(b) two drain ports 9 and 10;
(c) main fuel control solenoid 2;
(d) pilot fuel control solenoid 3;
(e) main fuel control valve 11;
(f) main fuel control valve spring 12;
(g) pilot fuel control valve 13; and
(h) pilot fuel control valve spring 14.

Preferably the hydraulic fluid and the pilot fuel are the same fluid and fluid inlets 6, 7 and 8 are all connected to a high pressure manifold, known as a "common rail" when the same manifold serves a plurality of injection valves in a multi-cylinder engine. Persons skilled in the technology involved here will understand that interior fluid passages can be employed to reduce the number of fluid inlets and drain ports in a substantially equivalent structure.

A control valve for injection valve 1 controls the flow of hydraulic fluid into and out of the body of injection valve 1 by controlling whether or not hydraulic fluid passages are fluidly connected to at least one of inlets 7 and 8, or at least one of respective drain ports 9 and 10. In the illustrated embodiment, valves 11 and 13 are two-way valves and are mechanically biased (by springs 12 and 14) in respective positions such that the hydraulic fluid passages that lead to respective drain ports 9 and 10 are blocked (as shown in FIG. 4). In this embodiment, inlets 7 and 8 are always open, but flow is restricted by respective orifices 7a and 8a. Other valve arrangements can be employed for controlling the flow of hydraulic fluid. For example, instead of orifice 7a or 8a, injection valve 1 can employ a three-way control valve such as, for example, a spool valve or a rotary valve, that alternately closes the respective inlet or outlet.

Injection valve 1 also preferably includes integral pilot fuel intensifier 15, which is illustrated in FIGS. 3 and 4. Intensifier 15 is fluidly linked to pilot fuel control valve 13.

As shown in FIG. 3, check valve 30 is associated with intensifier 15. Fluid passage 19, as seen in FIGS. 3 and 5, connects pilot fuel inlet 6 to intensifier 15 through check valve 30. That is, check valve 30 permits the one-way flow of pilot fuel from fluid passage 19 into space 27 below intensifier 15.

Injection valve 1 has a dual fuel needle assembly that comprises two concentric needle valves. Outer needle 17 is a hollow body disposed around inner needle 16. In preferred embodiments, outer needle 17 controls the injection of one fuel into the combustion chamber and inner needle 16 controls the injection of a second fuel into the combustion chamber.

The hollow body that is outer needle 17 also serves as the body for the inner needle valve assembly. The inner needle valve is in the closed position when a sealing surface of inner needle 16 is urged against a seat that is provided by a sealing surface of outer needle 17. In the illustrated embodiment of FIGS. 3 through 5, inner needle 16 is biased in the closed position by inner spring 18 in combination with the pressure of the hydraulic fluid within hydraulic fluid chamber 20.

A series of fuel ejection ports 4 are formed in the injection valve body at the tip of injection valve 1. A second series of fuel ejection ports 5 are formed in the tip of outer needle 17. Ejection ports 4 and 5 and the associated sealing surfaces of needles 16 and 17 are located at the tip of injection valve 1 to provide immediate injection of the main fuel and pilot fuel into the engine combustion chamber (not shown).

Outer needle 17 preferably controls the injection of gaseous main fuel since larger ejection ports are generally required for injecting larger quantities of main fuel compared to pilot fuel, and larger fuel ejection ports are more easily accommodated in the valve body rather than in the tip of outer needle 17. The smaller pilot fuel ejection ports can be can be easily accommodated in tip of outer needle 17.

Main fuel control valve 11 controls the flow of hydraulic fluid from chamber 20 to drain 10. When main fuel control valve 11 is in a closed position, high pressure hydraulic fluid flows through inlet 8 and orifice 8a and fills chamber 20. When main fuel control valve 11 is switched to an open position, hydraulic fluid drains from chamber 20 faster than it can be replenished through orifice 8a. Consequently, when main fuel control valve is open, the pressure within chamber 20 drops from the high pressure that is in the supply manifold ("rail pressure"), to close to drain pressure and the pressure of the main fuel in chamber 22 applies an opening force to a shoulder area of outer needle 17, causing outer needle 17 to retract within the injection valve body so that fuel within chamber 22 flows into the combustion chamber through ejection ports 4.

Main fuel cavity 22 is located in the bottom region of injection valve 1 and surrounds the lower portion of main fuel needle 17. The main fuel, which in preferred embodiments is gaseous fuel such as natural gas, is supplied to cavity 22 through inlet 23.

Differential pressures within injection valve 1 and particularly between main fuel cavity 22 and the other cavities within the main body of injection valve 1 are preferably sealed by a fluid seal comprising hydraulic fluid disposed within fluid seal cavity 24, as best seen in FIGS. 4 and 5.

Hydraulic fluid is supplied to the injection valve through a supply manifold or common rail at a substantially constant pressure. For example, in vehicular applications, an engine driven pump can be employed to pressurize the hydraulic fluid that is directed to the common rail. When the hydraulic fluid is different from the pilot fuel, the hydraulic fluid is introduced through ports 7 and 8 and the pilot fuel is introduced through inlet port 6. More preferably, the pilot fuel is a liquid fuel such as diesel, which can also be employed as the hydraulic fluid, and pilot fuel is supplied to ports 6, 7 and 8 from a common pressurized system or common rail. The rail pressure is the pressure of the fluid in the common rail.

The operation of the injection valve illustrated in FIGS. 3 through 5 is described herein for an embodiment that employs a gaseous fuel as the main fuel and a liquid fuel as the pilot fuel.

Inlet ports 7 and 8 are in constant fluid communication with respective chambers 25 and 20. Between injection events, main fuel needle 17 and inner needle 16 are in the closed position where they prevent fluid flow through respective ejection ports 4 and 5. Main fuel control valve 11 and pilot fuel control valve 13 are both in the closed position and the fluid pressure within chambers 25 and 20 is substantially equal to the rail pressure of the hydraulic fluid that is introduced through respective ports 7 and 8. Pressurized pilot fuel flows through inlet port 6 to fill space 27 below intensifier 15 via fluid passage 19 (see FIG. 3). However, because the intensifier piston surface area facing chamber 25 is larger than the intensifier surface area facing space 27 and the space between them is vented to drain, when second control valve 13 is closed, intensifier 15 assumes a position that maximizes the volume of chamber 25 and minimizes the volume of space 27 (as shown in FIGS. 3 and 4).

Inlet port 6 also supplies pressurized fluid to fluid seal cavity 24, where the pilot fuel provides a fluid seal around moveable outer needle 17. When pilot fuel is used for sealing, the pilot fuel is pressurized to a pressure equal to or slightly higher than that of the main gaseous fuel pressure within fuel cavity 22 to prevent the gaseous fuel from leaking past fluid seal cavity 24 (see FIGS. 4 and 5). However, sealing fluid pressure is preferably controlled so that it is equal to or not too much greater than gaseous fuel pressure, since it is also undesirable for excessive amounts of sealing fluid to leak into fuel cavity 22.

Between injection events, when injection valve 1 is not injecting fuel, main fuel control solenoid 2 and pilot fuel control solenoid 3 (see FIG. 4) are de-energized and control valves 11 and 13 are both biased in the closed position by respective control valve springs 12 and 14. The pressurized hydraulic fluid in chamber 20 that has been delivered through port 8 maintains outer needle 17 in a closed position and can also help to maintain inner needle 16 in a closed position. The compartment that houses inner spring 18 can be fluidly connected or sealed from chamber 20. When the spring compartment is fluidly connected to chamber 20, the pressure within the compartment is about equal to the pressure in chamber 20. When the spring compartment is sealed from chamber 20, the pressure within the compartment can be the same as the hydraulic fluid pressure at inlet 7 or at drain 9. Depending upon the fluid pressure within the spring compartment, some or all of the closing force applied to inner needle 16 is provided by inner spring 18.

In the embodiments of FIGS. 3 through 6, the metering of pilot fuel by injection valve 1 is accomplished by intensifier 15 that also serves to elevate the pressure of the pilot fuel to thereby open the inner needle valve. When pilot fuel control valve 13 is opened, hydraulic fluid pressure within chamber 25 is reduced to drain pressure and the pressure of the pilot fuel in space 27 is sufficient to lift the intensifier plunger. When the desired amount of pilot fuel has been drawn into space 27, pilot fuel control valve 13 is closed and hydraulic fluid pressure within chamber 25 is again elevated to a pressure close to rail pressure. Under the influence of the high pressure hydraulic fluid in chamber 25, the intensifier plunger moves downward to compress and pressurize the pilot fuel in space 27. The elevated pressure of the pilot fuel ensures that check valve 30 remains closed and the pressurized pilot fuel is directed into the inner needle valve assembly through fluid passage 26; the pressurized pilot fuel causes inner needle 16 to move to an open position against the bias imposed by inner spring 18 and the fluid pressure within the spring compartment, if any. Inner needle 16 returns to the closed position under the influence of inner spring 18 when after the injection of pilot fuel into the combustion chamber relieves the pressure of the pilot fuel within the inner needle assembly.

Inner spring 18 is disposed around inner needle stop 21, which is located above inner needle 16. In the illustrated embodiments, inner needle stop 21 includes a stem that limits the travel of inner needle 16. While inner needle stop 21 is depicted as a separate piece from inner needle 16, inner needle stop 21 and inner needle 16 can also be integrated into a single piece which would be functionally equivalent in limiting the travel of inner needle 16. However, an additional advantage of employing two separate pieces is that it is easier to fabricate two pieces because portions of inner needle 16 are match-fit with outer needle 17. As two separate pieces, inner needle stop 21 can function without being perfectly aligned with inner needle 16 and dimensional irregularities in the associated manufactured components can be accommodated.

The injection of the main gaseous fuel takes place when the main fuel control valve 11 opens to fluidly connect chamber 20 with drain port 10. The hydraulic fluid in chamber 20 drains through drain port 10 faster than it can be replenished from inlet port 8 through orifice 8a. Consequently, the pressure in chamber 20 is reduced allowing the high pressure of the gaseous fuel in cavity 22 to lift main fuel needle 17 into the open position to thereby inject the gaseous fuel within cavity 22 into the engine combustion chamber through ejection ports 4. The injection of gaseous fuel stops when main fuel control valve 11 is closed so that the pressure of the hydraulic fluid within chamber 20 is restored to rail pressure, causing gaseous-fuel needle 17 to move to a closed position, closing ejection ports 4.

Figures 6, 7, 8:
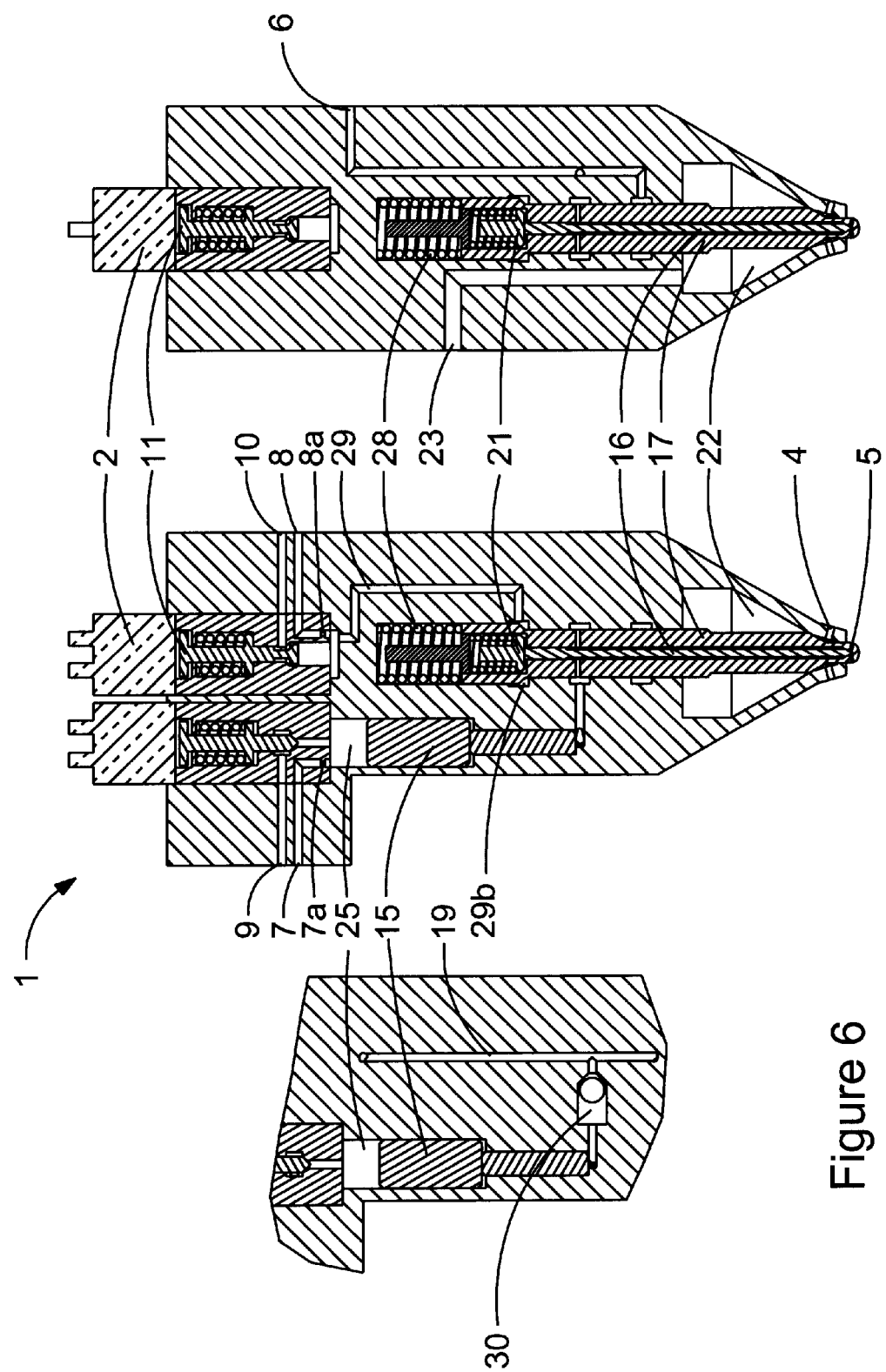
FIGS. 6, 7 and 8 show respective detail, side and front section views of a second embodiment of a dual fuel injection valve taken along sections lines C–C, A—A, and B–B shown externally in FIGS. 1 and 2. This embodiment of the injection valve uses high-pressure hydraulic fluid to move the first valve needle to the open position.

FIGS. 6, 7, and 8 show respective detail, side, and front section views of a second embodiment of the double solenoid dual fuel injection valve shown externally in FIGS. 1 and 2, with the respective sections taken along section lines C–C, A—A and B–B. This second embodiment has many components that are equivalent to like components of the embodiment presented in FIGS. 3, 4 and 5, and like components are identified by like reference numbers. The main difference between the first and second embodiments is that in the second embodiment outer spring 28 biases outer needle 17 in the closed position and high pressure hydraulic fluid is used to move outer needle 17 to the open position opposed to the arrangement of the first embodiment which employs hydraulic fluid pressure to hold outer needle 17 in the closed position.

With reference to FIG. 7, high-pressure hydraulic fluid enters injection valve 1 through fluid inlet 8. Main fuel control valve 11 is a two-way valve that controls the hydraulic fluid pressure within fluid passage 29 by controlling the flow of hydraulic fluid through drain port 10. When two-way main fuel control valve 11 moves to its closed position, the fluid connection to drain port 10 is closed, causing the pressure in cavity 29b to increase. Rail pressure in cavity 29b and the gaseous fuel pressure in cavity 22 combine to generate opening forces acting on outer needle 17 that are sufficient to overcome the closing force of outer spring 28, thereby moving main fuel needle 17 to the open position. The main fuel within cavity 22 is then injected through ejection ports 4, which are provided in the hollow tip of injection valve 1. An outer needle stop, similar to inner needle stop 21, limits the travel of outer needle 17 by limiting the compression of outer spring 28. The injection of gaseous fuel stops when main fuel control valve is opened and the hydraulic fluid pressure within cavity 29b is reduced from rail pressure to drain pressure. Under the influence of outer spring 28 outer needle 17 returns to the closed position with the sealing surface of needle 17 seated against a corresponding sealing surface of the valve body.

The remaining features of the injection valve depicted in the second embodiment function substantially the same as those described with reference to the first embodiment.

FIGS. 9 through 12 shows four different embodiments of another embodiment of a hydraulically actuated dual fuel injection valve for independently and separately injecting a main fuel and a pilot fuel into a combustion chamber. Each needle is associated with a respective control chamber in which the hydraulic fluid pressure can be independently controlled to influence the movement of the respective needle.

Figure 9:
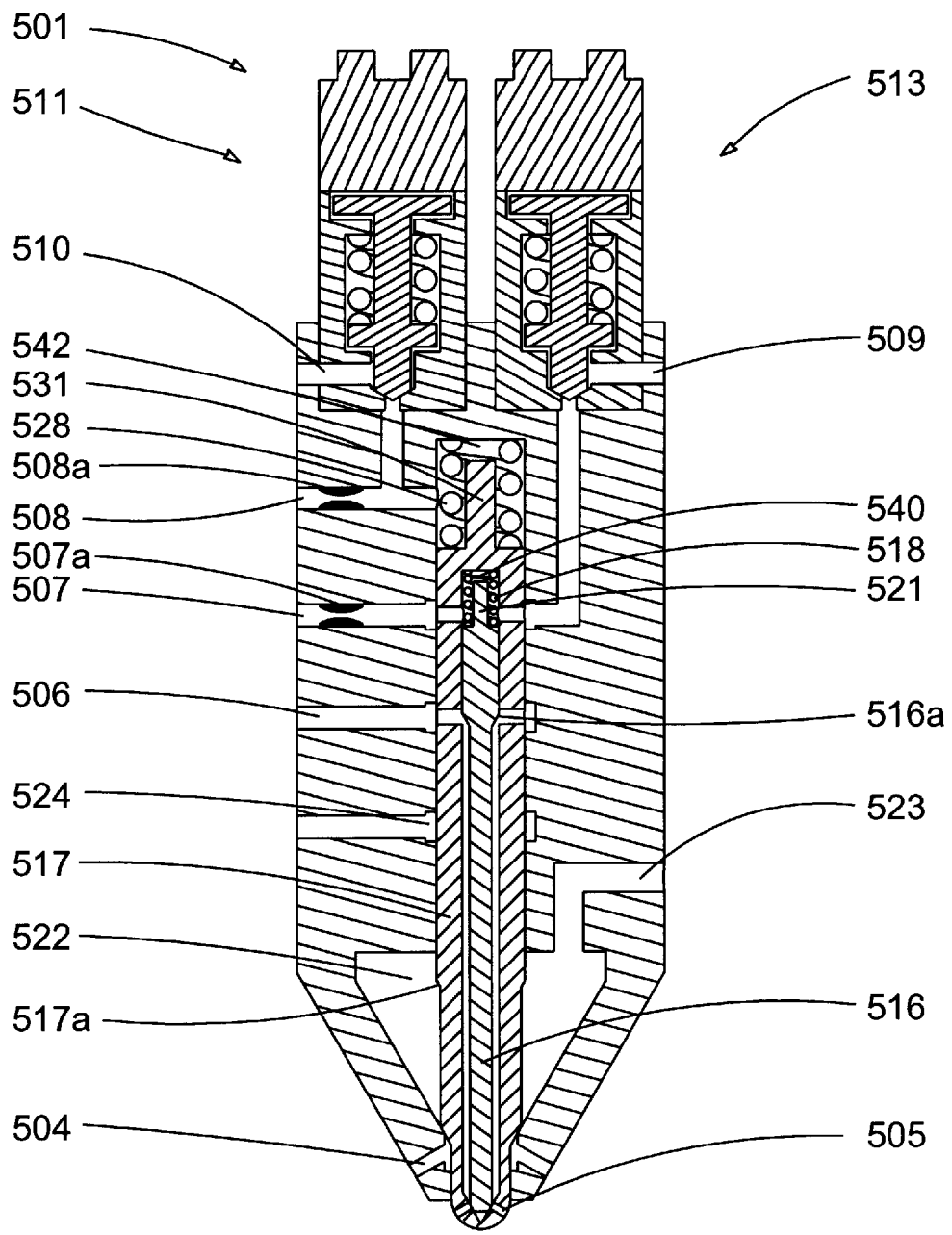
FIGS. 9 through 12 depict four different arrangements for an embodiment of an injection valve that is supplied with high pressure main fuel and pilot fuel at injection pressure where the respective injection valves are each independently actuable for separately injecting pilot fuel and main fuel.
Figure 10:
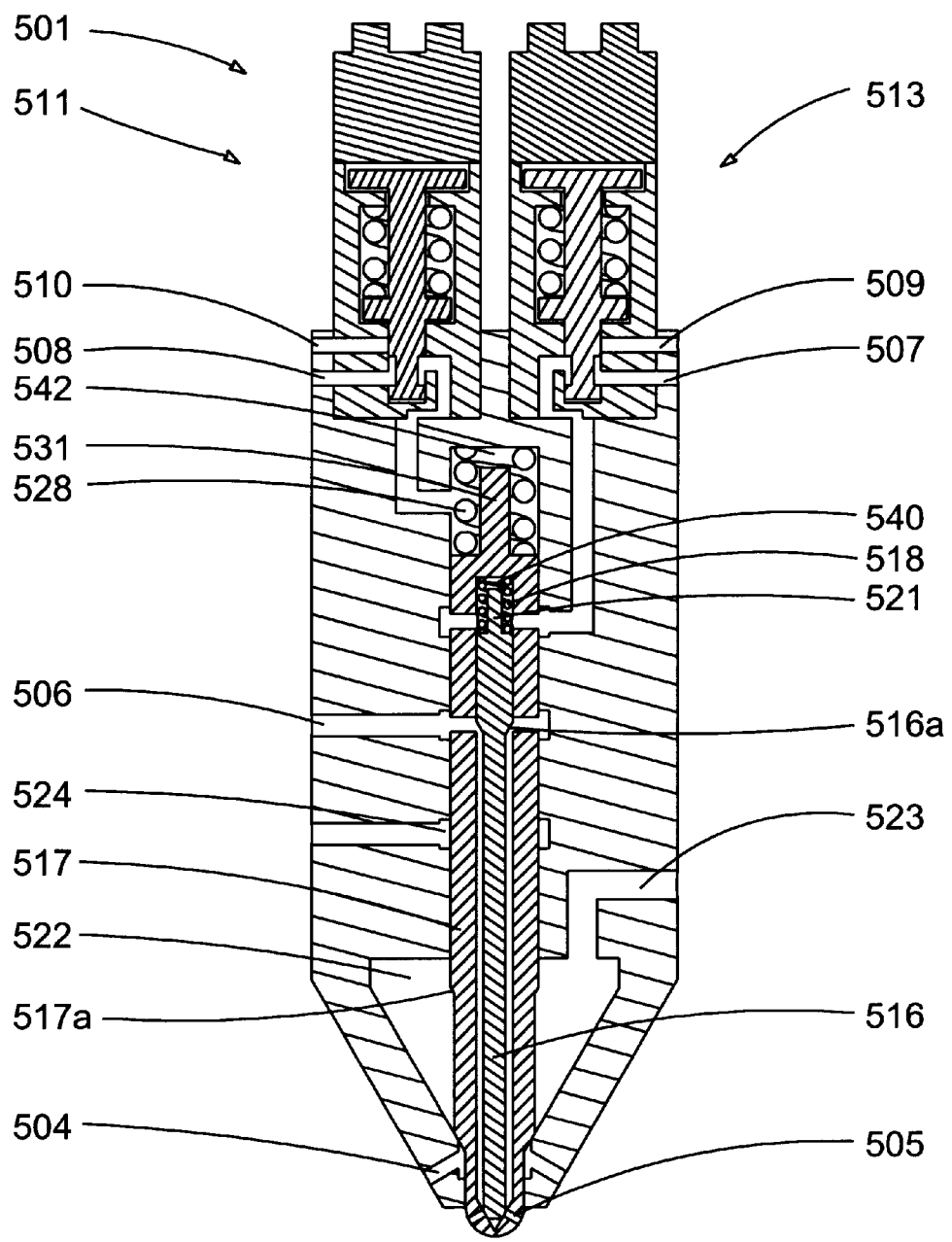

In the embodiments of FIGS. 9 and 10, high-pressure hydraulic fluid biases both the outer needle and the inner needle in the closed position. When hydraulic fluid pressure in a first control chamber is equal to rail pressure, the outer needle is held in the closed position, and when the pressure in the first control chamber is reduced to drain pressure, the outer needle moves to the open position under the influence of the fuel pressure acting on the outer needle. The hydraulic fluid pressure in a second control chamber is similarly controlled to influence the movement of the inner needle.

Figure 11:
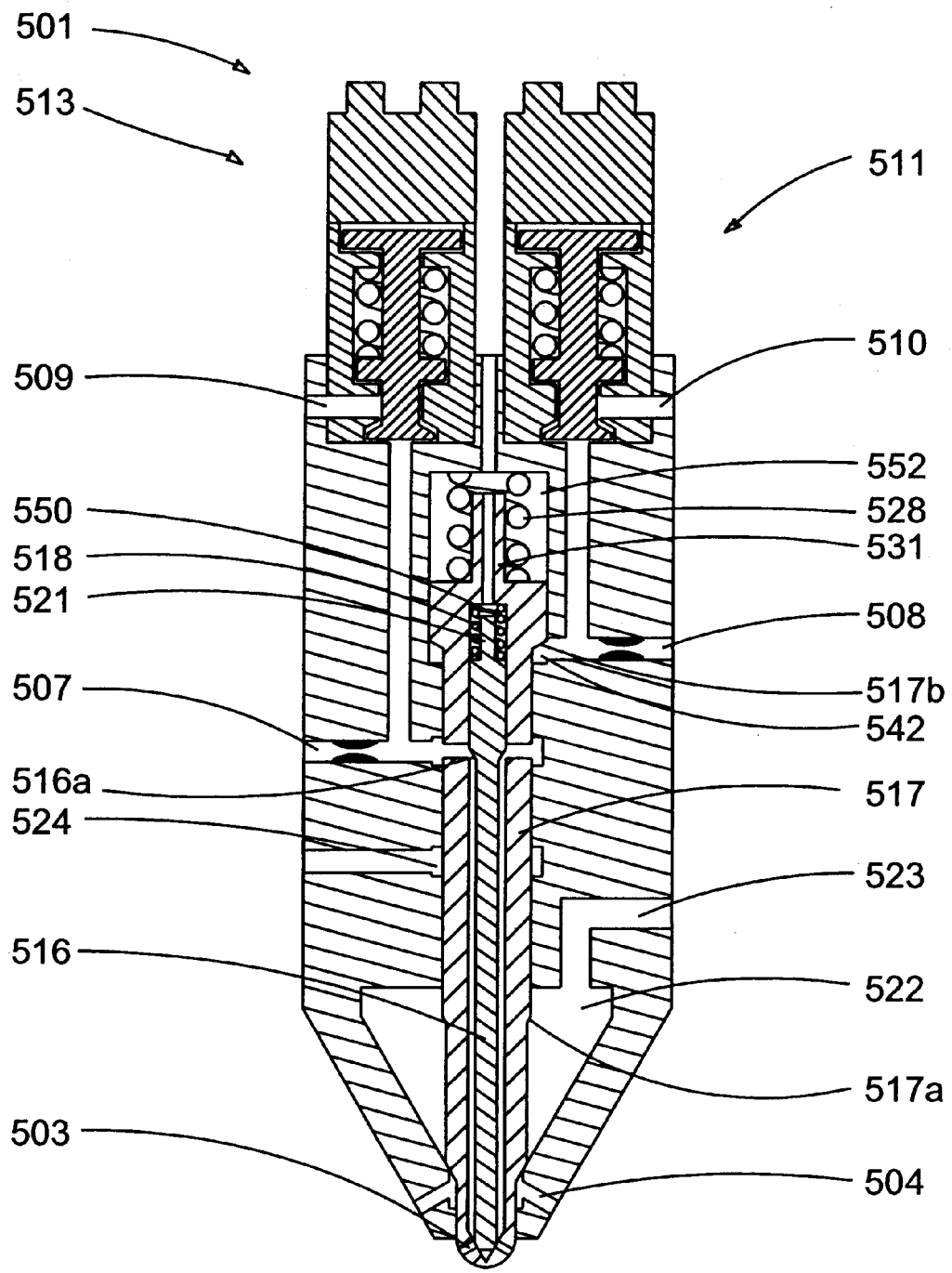
Figure 12:
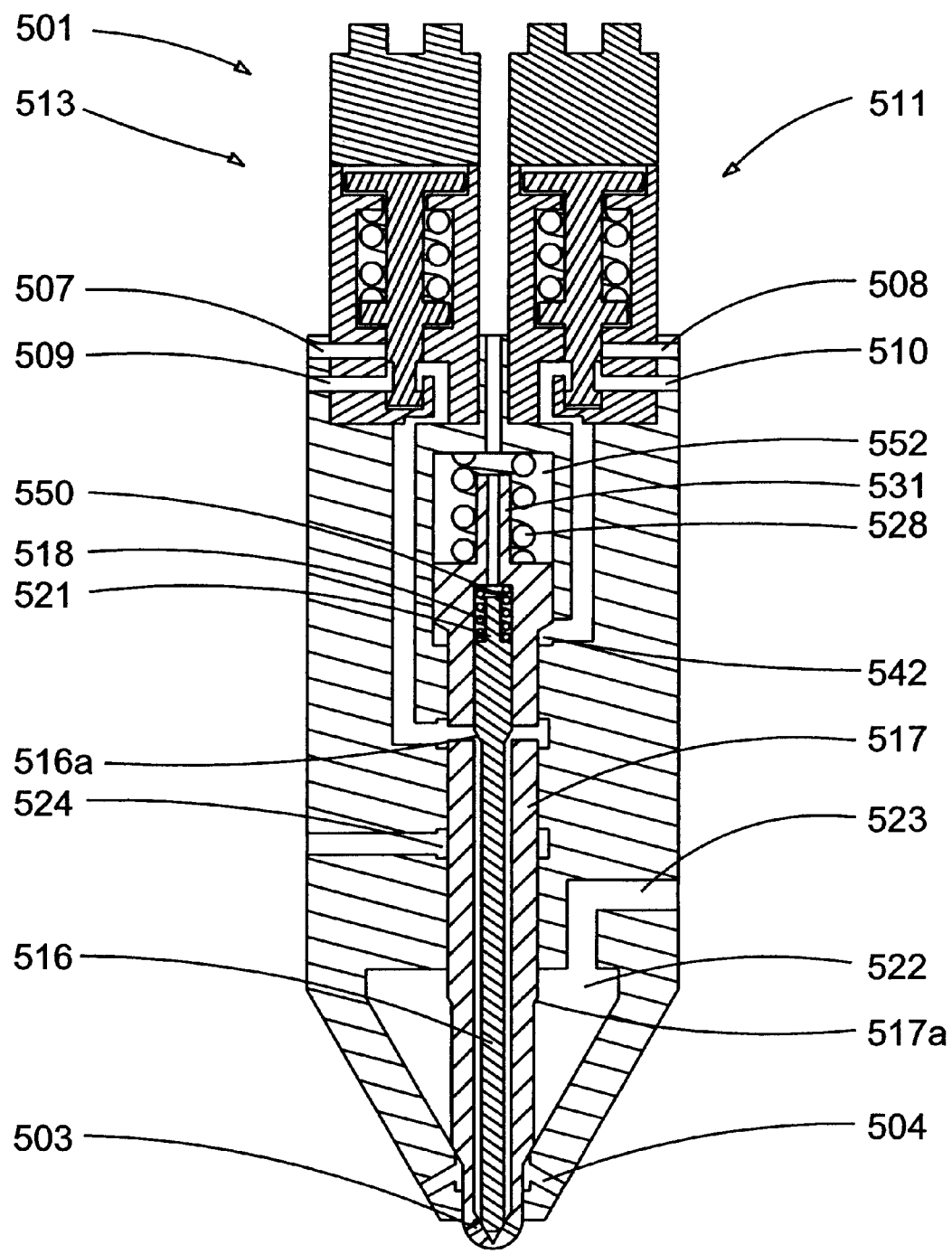

In the embodiments of FIGS. 11 and 12, the inner and outer needles are spring biased in the closed position and hydraulic fluid at rail pressure directed to respective control chambers for the inner and outer valve needles to move them to the open position.

The pressure in the first and second control chambers is independently controlled so that the movements of the outer needle and the inner needle can be independent from one another.

With reference to all of the embodiments of FIGS. 9 through 12, like components are identified by like reference numbers. In these embodiments, injection valve 501 generally comprises the following features for controlling the flow of hydraulic fluid:

(a) at least one hydraulic fluid inlet such as 507 and/or 508;
(b) at least one drain port such as 509 and/or 510;
(c) main fuel hydraulic fluid control valve 511;
(d) pilot fuel hydraulic fluid control valve 513;
(e) main fuel control chamber 542; and
(f) pilot fuel control chamber 540.

Some of the features common to more than one embodiment will be described in overview prior to describing the operation of each embodiment.

In the embodiments illustrated in FIGS. 9 and 10, the pilot fuel and the hydraulic fluid can be different fluids and a separate pilot fuel inlet port 506 is provided. However, if the pilot fuel and the hydraulic fluid are the same fluid a single common rail can be employed to supply fluid to the hydraulic fluid passages and to the fuel cavities within the pilot fuel valve assembly.

In the embodiments illustrated in FIGS. 11 and 12, the hydraulic actuation fluid for inner needle 516 and the pilot fuel are the same fluid, which avoids separate inlet ports for the pilot fuel and the hydraulic fluid for actuating the inner needle.

Main fuel hydraulic fluid control valves 511 and pilot fuel hydraulic fluid control valve 513 are generally the same as the hydraulic fluid control valves described with reference to previously described embodiments. That is, hydraulic fluid control valves 511 and 513 employ a solenoid that is energized to move and hold the valve in one position. When the solenoid is de-energized, a spring moves and holds the valve in an opposite position. The operation of the injection valves will be described in more detail below, but generally, different valve types can be employed to control the flow of high pressure hydraulic fluid to and from control chambers 540 and 542. For example, FIGS. 9 and 11 show two-way valves for controlling hydraulic fluid flow and FIGS. 10 and 12 show three way valves.

Like the embodiments of injection valve 1 shown in FIGS. 3 through 8, injection valve 501 has a dual fuel needle assembly that comprises two concentric needle valves. Outer needle 517 is a hollow body disposed around inner needle 516. In preferred embodiments, outer needle 517 controls the injection of a gaseous main fuel into the combustion chamber and inner needle 516 controls the injection of a liquid pilot fuel into the combustion chamber.

Inner needle stop 521 limits the travel of inner needle 516 and outer needle stop 531 limits the travel of outer needle 517.

The hollow body that is outer needle 517 also serves as the body for the inner needle valve assembly. The inner needle valve is in the closed position when a sealing surface of inner needle 516 is urged against a seat that is a sealing surface of outer needle 517.

A series of fuel ejection ports 504 are formed in the injection valve body at the tip of injection valve 501. A second series of fuel ejection ports 505 are formed in the tip of outer needle 517, which provide an opening for ejecting the pilot fuel into the engine combustion chamber when the inner needle valve is in an open position. Ejection ports 504 and 505 and the associated tips of needles 516 and 517 are located proximate to each other at the tip of injection valve 501 to provide immediate injection of the main fuel and pilot fuel into the engine combustion chamber (not shown).

Differential pressures within injection valve 501 and particularly between main fuel cavity 522 and the other cavities within the main body of injection valve 501 are preferably sealed by a fluid seal comprising hydraulic fluid disposed within fluid seal cavity 524. In the embodiments of FIGS. 15 and 16, instead of a separate fluid seal cavity, the cavity employed for supplying liquid pilot fuel to the inner needle assembly can also serve as a fluid seal. This is conveniently accomplished when the pilot fuel supplied from the common rail to the pilot fuel cavity is already at injection pressure since this pressure can be set to substantially match or slightly exceed the pressure of the gaseous fuel directed to main fuel cavity 522 through inlet 523. In the embodiments of FIGS. 11 and 12 a separate fluid seal cavity is employed because pilot fuel pressure is not always at rail pressure.

The operation of the different embodiments of injection valve 501 illustrated in FIGS. 9 through 12 will be described below in relation to an injection valve that employs a gaseous fuel as the main fuel and a liquid pilot fuel as the pilot fuel.

In the embodiment of FIG. 9, when hydraulic fluid control valves 511 and 513 are de-energized, these control valves are both spring-biased in the seated position to prevent hydraulic fluid from being drained from respective control chambers 542 and 540. Hydraulic fluid at rail pressure is supplied to control chambers 542 and 540 through inlets 507 and 508. The hydraulic fluid pressure within chambers 542 and 540 is thus normally maintained at rail pressure to apply a closing force to respective needles 517 and 516, in conjunction with the closing forces applied by springs 528 and 518.

When the solenoid for main fuel hydraulic fluid control valve 511 is energized, this control valve opens and hydraulic fluid from main fuel control chamber 542 drains through drain port 510 faster than it can be replenished through inlet 508 because flow through inlet 508 is restricted by orifice 508a. Consequently, when main fuel hydraulic fluid control valve 511 is energized, the main fuel within main fuel cavity 522 is ejected from injection valve 501 through ejection ports 504 because outer needle 517 moves to the open position under the influence of gaseous fuel pressure acting on shoulder 517a which overcomes the closing force of outer spring 528 and the drain pressure within control chamber 542. The main fuel injection event ends when the solenoid is again de-energized and control chamber 542 is again filled with hydraulic fluid at rail pressure.

In this embodiment, because the pilot fuel is supplied to injection valve 501 at injection pressure, there is no internal intensifier and inner needle 516 is operated in a manner very similar to outer needle 517. When the solenoid for pilot fuel hydraulic fluid control valve 513 is energized, this control valve opens and hydraulic fluid from pilot fuel control chamber 540 drains through drain port 509 faster than it can be replenished through inlet 507 because flow through inlet 507 is restricted by orifice 507a. Consequently, when the solenoid for pilot fuel hydraulic fluid control valve 513 is energized, the pilot fuel within the inner needle assembly is ejected from injection valve 501 through ejection ports 505 because inner needle 516 moves to the open position under the influence of pilot fuel pressure acting on shoulder 516a which overcomes the closing force of inner spring 518 and the drain pressure within control chamber 540. The pilot fuel injection event ends when the solenoid is again de-energized and control chamber 540 is again filled with hydraulic fluid at rail pressure.

The embodiment of FIG. 10 operates in substantially the same way as the embodiment of FIG. 9 except that instead of employing two-way control valves with orifices to restrict flow through hydraulic fluid inlets 507 and 508, the embodiment of FIG. 10 employs three-way control valves employing a spool-style valve to alternate between connecting control chambers 540 and 542 with respective inlets 507 and 508 or drain ports 509 and 510. In the illustrated embodiment, the spool valves are spring biased to connect control chambers 540 and 542 with respective inlets 507 and 508. The needles 516 and 517 are thus normally in the closed position because respective control chambers 540 and 542 are normally filled with hydraulic fluid at rail pressure. A main fuel or pilot fuel injection event is initiated by energizing the solenoid for the respective hydraulic fluid control valve (513 for pilot fuel and 511 for main fuel). Energizing the solenoid moves the spool valve to a position that connects the respective control chamber with the drain port instead of the inlet.

In the embodiment of FIG. 11, hydraulic fluid control valves 511 and 513 are both spring-biased in the open position so that when their respective solenoids are de-energized, these control valves connect the hydraulic fluid passages and control chambers within injection valve 501 with drain ports 509 and 510. That is, when the control valve solenoids are de-energized, hydraulic fluid pressure within injection valve 501 is at drain pressure and inner spring 518 and outer spring 528 provide the forces needed to maintain inner needle 516 and outer needle 517 in their respective closed positions.

In the embodiment of FIG. 11, the pilot and the hydraulic fluid are the same fluid and a pilot fuel injection event is initiated by energizing the solenoid of pilot fuel hydraulic fluid control valve 513 to close drain port 509 so that pilot fuel at rail pressure fills the fuel cavity of the inner needle assembly. The pilot fuel pressure exerts an opening force on shoulder 516a of inner needle 516 that overcomes the closing force of inner spring 518, and pilot fuel is ejected from injection valve 501 through pilot fuel ejection ports 503. The pilot fuel injection event is terminated de-energizing the solenoid to re-open pilot fuel hydraulic fluid control valve 513 so that pilot fuel pressure within the inner needle assembly is reduced to drain pressure, and inner spring 518 causes inner needle 516 to move to the closed position. In the illustrated embodiment, inner spring chamber 550 is not pressurized and pilot fuel that migrates from the inner needle assembly to inner spring chamber 550 is recovered by being sent to the drain system.

A main fuel injection event in the embodiment of FIG. 11 is controlled in a similar manner to a pilot fuel injection event of the same embodiment. By energizing the solenoid of main fuel hydraulic fluid control valve 511 to close drain port 510, hydraulic fluid at rail pressure fills control chamber 542 to exert an opening force on should 517b of outer needle 517 which combines with the opening force exerted by the pressure of the gaseous fuel on shoulder 517a to overcome the closing force of outer spring 528. These opening forces cause outer needle 517 to move to the open position to allow main fuel to be ejected from injection valve 501 through main fuel ejection ports 504. The main fuel injection event is terminated by re-opening main fuel hydraulic fluid control valve 511 so that hydraulic fluid pressure within control chamber 542 is reduced to drain pressure, and outer spring 528 causes outer needle 517 to move to the closed position. In the illustrated embodiment, outer spring chamber 552 is not pressurized and hydraulic fluid that migrates from control chamber 542 to outer spring chamber 552 is recovered by being sent to the drain system.

The embodiment of FIG. 12 operates in substantially the same way as the embodiment of FIG. 11 except that instead of employing two-way control valves with orifices to restrict flow through hydraulic fluid inlets 507 and 508, the embodiment of FIG. 12 employs three-way control valves employing a spool-style valve to alternate between connecting needle valve assemblies with respective inlets 507 and 508 or drain ports 509 and 510. In the illustrated embodiment, the spool valves are spring biased to connect the pilot fuel and main fuel needle valve assemblies with respective drain ports 509 and 510. The needles 516 and 517 are thus normally in the closed position because hydraulic fluid at rail pressure is employed to open the needle valves. A main fuel or pilot fuel injection event is initiated by energizing the solenoid for the respective hydraulic fluid control valve (513 for pilot fuel and 511 for main fuel). Energizing the solenoid moves the spool valve to a position that connects the respective needle valve assembly with an inlet instead of a drain port.

FIGS. 13 through 18 depict two different embodiments of a dual needle assembly that can be employed by an injection valve for independently injecting two different fuels through separate ejection ports. With reference to both embodiments illustrated in FIGS. 13 through 18, an inner spring provides the closing force that biases the inner needle in the closed position, and hydraulic fluid pressure applied to the top of the dual needle assembly provides the closing force that biases the outer needle in the closed position.

With reference to FIGS. 13 through 15, dual needle valve assembly 600 comprises outer needle 617 and cap 620. Tip 607 is the portion of the assembly that protrudes through an opening in the valve body as shown, for example, in FIG. 4. Pilot fuel ejection ports 605 are positioned on the end of tip 607, as shown in FIG. 9.

Outer needle 617 features shoulder 610 that is disposable in a main fuel cavity such as main fuel cavity 22 shown in FIG. 4. The fuel pressure in the main fuel cavity applies a hydraulic force to the shoulder area that causes outer needle 617 to move to the open position when the pressure above cap 620 is reduced to drain pressure.

Because cap 620 is not attached to outer needle 617, inner spring 618 can expand to space cap 620 away from outer needle 617. For example, when rail pressure is reduced but still higher than drain pressure, inner spring 618 can contribute to the closing force that keeps outer needle 617 in the closed position. In this capacity inner spring 618 advantageously provides additional benefits in addition to its primary function of biasing inner needle 616 in the closed position.

Needle stop 621 comprises stem 621b that limits the compression of inner spring 618 when the end of stem 621b is pressed against cap 620. Needle stop 621 further comprises flange 621a which provides a seat for inner spring 618 so that the closing force applied by inner spring 618 is transferred through needle stop 621 to inner needle 616 and the end of outer needle 617 when cap 620 is spaced apart from outer needle 617.

To reduce leakage, the portion of outer needle 617 between shoulder 610 and the end facing cap 620 is match-fit with the valve body, as is the outer diameter of cap 620.

Pilot fuel port 615 provides a passage for supplying pilot fuel to the inner needle valve assembly. For example, with reference to FIG. 4, port 615 would be aligned with the annular cavity that is supplied with fuel from intensifier 15 via fluid passage 26.

Those skilled in the technology involved here will understand that an outer spring and an outer needle stop can be added to the top of the dual needle assembly illustrated in FIGS. 13 through 15, for an embodiment suitable for use in an injection valve of the type illustrated in FIGS. 6 through 8. In such an embodiment, outer needle 617 further comprises an additional shoulder, located, for example, between pilot fuel port 615 and the end facing cap 620, which is associated with a control chamber. Hydraulic fluid at rail pressure is directable to the control chamber to cause outer needle 617 to move to the open position. When hydraulic fluid pressure in the control chamber is reduced to drain pressure, the outer spring exerts a closing force on outer needle 617 that moves it to the closed position. In this embodiment, cap 620 can be attached to outer needle 617, for example, by a threaded connection, since in such an embodiment inner spring 618 does not add to the closing force of the outer spring.

Another embodiment of the dual needle assembly is depicted in FIGS. 16 through 18. Dual needle assembly 700 comprises an inner needle assembly that is similar to that of the previously described embodiments. That is, inner needle 716 is biased in the closed position by inner spring 718 that transmits a closing force through the flange of inner needle stop 721. Inner needle 716 is disposed within hollow outer needle 717 and a sealing surface near the tip of inner needle 716 seats against a sealing surface of outer needle 717 when in the closed position. High pressure pilot fuel is directed to pilot fuel port 715 to move inner needle 716 to an open position.

The inner needle assembly is housed within the hollow body of outer needle 717, inner valve housing 730, and inner valve cap 722, which are all releasably joined to each other in a fixed relationship, for example, by threaded connections. Inner valve cap 722 and inner valve housing 730 could also be integrated as a single component if the arrangement is modified to allow inner spring 718 and inner needle stop 721 to be inserted from the bottom. The inner spring chamber, which houses inner spring 718 can be connected by port 732 to the hydraulic fluid system at rail pressure or drain pressure, or to the pressurized pilot fuel supply system. That is, the inner spring chamber need not be pressurized, but an advantage of filling this chamber with pressurized fluid is that the fluid pressure acts upon the flange of inner needle stop 721 to contribute to the closing forces applied to inner needle 716 so that a smaller inner spring can be employed.

Plunger 720 is match fit with the valve body with the top of plunger 720 forming one of the boundaries for a hydraulic fluid chamber such as chamber 20 shown in FIGS. 4 and 5. When the hydraulic fluid chamber is filled with hydraulic fluid at rail pressure, outer needle 717 is held in the closed position by a closing force that is transmitted to it through plunger 720, inner valve cap 722, and inner valve housing 730. When the hydraulic fluid chamber is connected to a drain port and the pressure is reduced to drain pressure, the high pressure fuel acts on shoulder 710 to move outer needle 717 to the open position.

Outer spring 724 is disposed between inner valve cap 722 and seating ring 726 that is itself seated against a fixed annular ledge of the valve body. Outer spring 724 contributes to the closing force for outer needle 717 to keep it in the closed position when rail pressure is reduced but still higher than drain pressure. Outer spring 724 also helps to shape the injection pulse by slowing the outer needle rise time and accelerating the outer needle closing.

Tip 707 is the portion of the assembly which passes through an opening in the valve body as shown, for example in FIG. 4. Pilot fuel ejection ports 705 are positioned on the end of tip 707, as shown in FIG. 12.

To reduce leakage, the portion of outer needle 717 between shoulder 710 and the end joined to inner valve housing 730 is match-fit with the valve body.

As will be apparent to those skilled on the art in the light of the foregoing disclosure, many alterations and modifications are possible in the practice of this invention without departing from the scope thereof. Accordingly, the scope of the invention is to be construed in accordance with the substance defined by the following claims.

What is claimed is:

1. A method of operating a dual fuel injection valve for independently and separately injecting two different fuels into a combustion chamber of an internal combustion engine, said method comprising:
   (a) supplying a first fuel at injection pressure to a first-fuel cavity within said injection valve;
   (b) selectively applying a first closing force to a first needle to prevent said first fuel from being injected into said combustion chamber by holding said first needle in a closed position against a first seat;
   (c) selectively injecting said first fuel into said combustion chamber from said first-fuel cavity by at least one of applying a first opening force to said first needle that is greater than said first closing force and reducing said first closing force such that said first needle is spaced apart from said first seat;
   (d) supplying a second fuel at injection pressure to a second-fuel cavity within said injection valve;
   (e) selectively applying a second closing force to a second needle to prevent said second fuel from being injected into said combustion chamber by holding said second needle in a closed position against a second seat;
   (f) selectively injecting said second fuel into said combustion chamber from said second-fuel cavity by at least one of applying a second opening force to said second needle that is greater than said second closing force and reducing said second closing force such that said second needle is spaced apart from said second seat.

2. The method of claim 1 wherein the pressure of said first fuel within said first-fuel cavity contributes to said first opening force by applying an opening force to a shoulder of said first needle.

3. The method of claim 2 wherein said first closing force is generated by directing a pressurized hydraulic fluid to a control chamber within said injection valve and said first fuel is injected when pressure within said control chamber is reduced by draining hydraulic fluid from said control chamber.

4. The method of claim 3 further comprising selectively operating an electronically controlled valve to control the flow of said hydraulic fluid to and from said control chamber.

5. The method of claim 2 wherein said first closing force is generated by a compressed spring and said first fuel is injected into said combustion chamber by directing a pressurized hydraulic fluid to a control chamber within which a shoulder of said first needle is dynamically disposed, and said hydraulic fluid pressure acting on said shoulder contributes to said first opening force such that said first opening force becomes greater than said first closing force.

6. The method of claim 5 further comprising selectively operating an electronically controlled valve to control the flow of said hydraulic fluid to and from said control chamber.

7. The method of claim 1 wherein a compressed spring contributes to said second closing force.

8. The method of claim 7 wherein the pressure of said second fuel within said second-fuel cavity contributes to said second opening force by applying an opening force to a shoulder of said second needle.

9. The method of claim 8 wherein said second closing force is generated by directing a pressurized hydraulic fluid to a second control chamber within said injection valve and said second fuel is injected when pressure within said second control chamber is reduced by draining hydraulic fluid from said second control chamber.

10. The method of claim 9 further comprising selectively operating an electronically controlled valve to control the flow of said hydraulic fluid to and from said second control chamber.

11. The method of claim 8 wherein said opening force generated by said second fuel within said second-fuel cavity is greater than said closing force when said second fuel is within said second-fuel cavity at injection pressure, and injection is stopped by reducing the pressure of said second fuel by connecting said second-fuel with a drain port.

12. A dual fuel injection valve for independently and separately injecting two different fuels into a combustion chamber of an internal combustion engine, said dual fuel injection valve comprising:
   (a) a hollow injection valve body comprising:
      a first-fuel inlet port through which a first fuel can be introduced at injection pressure into said valve body;
      a first-fuel passage provided within said valve body and extending between said first-fuel inlet port and a first-fuel cavity;
      a second-fuel inlet port through which a second fuel can be introduced at injection pressure into said valve body;
      a second-fuel passage connecting said second-fuel inlet port to a second-fuel cavity;
   (b) a dual needle assembly comprising:
      an outer needle, which is hollow and disposed within said injection valve body, wherein said outer needle is movable between a closed position in which a first sealing surface associated with said outer needle contacts a first seat associated with said body and an open position in which said first sealing surface is spaced apart from said first seat, allowing said first fuel to flow from within said first-fuel cavity into said combustion chamber through at least one first-fuel ejection port; and
      an inner needle, which is disposed within said hollow outer needle, wherein said inner needle is movable between a closed position in which a second sealing surface associated with said inner needle contacts a second seat associated with said outer needle and an open position in which said second sealing surface is spaced apart from said second seat, allowing said second fuel to flow from within said second-fuel cavity into said combustion chamber through at least one second-fuel ejection port;
   (c) a first actuator assembly operable to selectively move said outer needle between said open and closed positions:
   (d) a second actuator assembly operable to selectively move said inner needle between said open and closed positions, wherein at least one of said first and second actuator assemblies comprising a hydraulic actuator;
   (e) a hydraulic fluid inlet port through which pressurized hydraulic fluid can be introduced into fluid passages and a control chamber disposed within the interior of said valve body;
   (f) a hydraulic fluid drain port through which hydraulic fluid can be drained from said control chamber; and (g) at least one control valve that is operable to selectively govern the flow of said hydraulic fluid whereby hydraulic fluid pressure within said control chamber is controllable to influence movement of at least one of said outer needle and said inner needle between respective open and closed positions; and (h) wherein said control chamber is employed to influence the position of said outer needle and said control valve is operable to selectively control the flow of hydraulic fluid between said control chamber and said drain port or between said hydraulic fluid inlet port and said control chamber, to modulate pressure within said control chamber between drain pressure, when pressure within said control chamber is substantially equal to pressure at said drain port, and rail pressure, when pressure within said control chamber substantially equal to pressure at said hydraulic fluid inlet port.

13. The injection valve of claim 12 wherein said first fuel is a main fuel and said second fuel is a pilot fuel that is more auto-ignitable than said main fuel.

14. The injection valve of claim 12 wherein said outer needle serves as an inner valve body and said second-fuel cavity is an annular cavity disposed between said inner needle and said outer needle.

15. The dual fuel injection valve of claim 12 wherein a portion of said dual needle assembly is dynamically disposed within said control chamber and the volume of said control chamber is variable in response to movement of said dual needle assembly.

16. The dual fuel injection valve of claim 15 wherein pressure within said control chamber can be held substantially at rail pressure to generate a hydraulic force that can contribute to maintaining said outer needle in said closed position.

17. The dual fuel injection valve of claim 16 wherein a spring provides an additional closing force that cooperates with said hydraulic force to maintain said outer needle in said closed position.

18. The dual fuel injection valve of claim 16 wherein fuel pressure within said first-fuel cavity generates an opening force acting on said outer needle whereby said outer needle is movable to said open position under the influence of said opening force when pressure within said control chamber is reduced to said drain pressure.

19. The dual fuel injection valve of claim 12 wherein said body further comprises a second control chamber employed to influence the position of said inner needle and a second control valve is operable to selectively control pressure of hydraulic fluid within said second control chamber to generate a hydraulic force that contributes to positioning said inner needle in one of said closed or open positions.

20. The dual fuel injection valve of claim 19 wherein said inner needle comprises a shoulder which is dynamically disposed within said second-fuel cavity and said shoulder provides an area for receiving an opening force generated by fuel pressure within said second-fuel cavity.

21. The dual fuel injection valve of claim 20 further comprising an inner spring disposed within said dual needle assembly that biases said inner needle in said closed position.

22. The dual fuel injection valve of claim 19 wherein rail pressure within said second control chamber is employed to generate a hydraulic force that contributes to maintaining said inner needle in said closed position.

23. The dual fuel injection valve of claim 22 wherein said second control chamber is disposed within said dual needle assembly and a member associated with said inner needle is dynamically disposed within said second control chamber such that the volume of said second control chamber is variable in response to movement of said member which causes a corresponding movement of said inner needle.

24. The dual fuel injection valve of claim 22 wherein an inner spring provides an additional closing force that cooperates with said hydraulic force to maintain said inner needle in said closed position.

25. The dual fuel injection valve of claim 22 wherein said dual needle assembly further comprises an inner valve body comprising:

said outer needle;
a hollow inner valve housing joined to said outer needle; and
a cap joined to said hollow inner valve housing.

26. The dual fuel injection valve of claim 25 wherein said inner needle is disposed within said outer needle and said second-fuel cavity is an annular space between said inner needle and said outer needle, and disposed within said hollow inner valve housing is at least one of an inner spring and said second control chamber for biasing said inner needle in said closed position.

27. The dual fuel injection valve of claim 26 wherein said cap is dynamically disposed within said control chamber associated with said outer needle.

28. The dual fuel injection valve of claim 27 further comprising an outer spring disposed between said cap and said valve body whereby said outer spring contributes to biasing said outer needle in said closed position.

29. The dual fuel injection valve of claim 19 wherein said dual needle assembly further comprises a cap dynamically disposed within said control chamber between said outer needle and said valve body such that when said control chamber associated with said outer needle is filled with hydraulic fluid at rail pressure, said hydraulic force urges said cap towards said outer needle and a closing force is transmitted through said cap to said outer needle.

30. The dual fuel injection valve of claim 29 wherein said outer needle is movable to said open position under the influence of fuel pressure within said first-fuel cavity acting on said outer needle when pressure within said control chamber is reduced to close to drain pressure.

31. The dual fuel injection valve of claim 30 further comprising an inner spring disposed within said hollow outer needle between said cap and said inner needle for biasing said inner needle in said closed position.

32. The dual fuel injection valve of claim 30 wherein said cap comprises an open-ended bore facing said inner needle, said assembly further comprising an inner spring disposed within said bore between said cap and said inner needle and said inner spring biases said inner needle in said closed position.

33. The dual fuel injection valve of claim 32 wherein said cap is detached from said outer needle such that said inner spring can expand to contribute to holding said outer needle in said closed position by spacing said cap from said outer needle.

34. The dual fuel injection valve of claim 32 wherein said cap is joinable in fixed relationship to said outer needle.

35. The dual fuel injection valve of claim 34 wherein said cap is releasably joined to said outer needle by a threaded connection or by interlocking features.

36. The dual fuel injection valve of claim 19 wherein said dual needle assembly further comprises:

a cap dynamically disposed within said control chamber associated with said outer needle whereby a closing force can be transmitted through said cap to said outer needle; and an inner spring disposed between said cap and a member associated with said inner needle;

wherein said inner spring contributes to biasing said inner needle in said closed position by imparting a closing force through said member to said inner needle, and said inner spring can also contribute to biasing said outer needle in said closed position by expanding to space said cap from said outer needle.

* * * * *